Jan. 6, 1959   P. N. YOUTZ   2,867,111
APPARATUS FOR ERECTING BUILDINGS
Filed Aug. 1, 1952   12 Sheets-Sheet 4
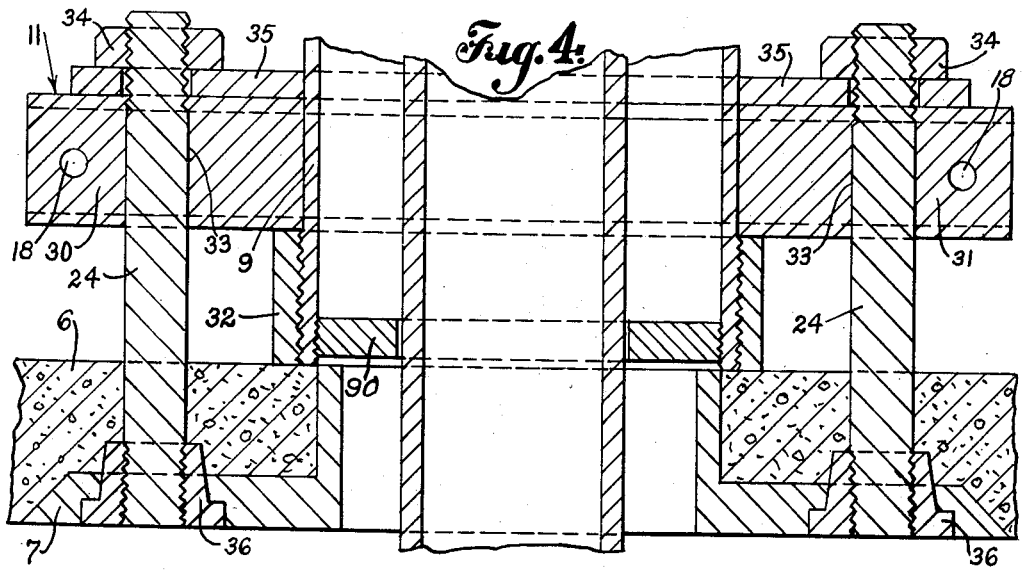
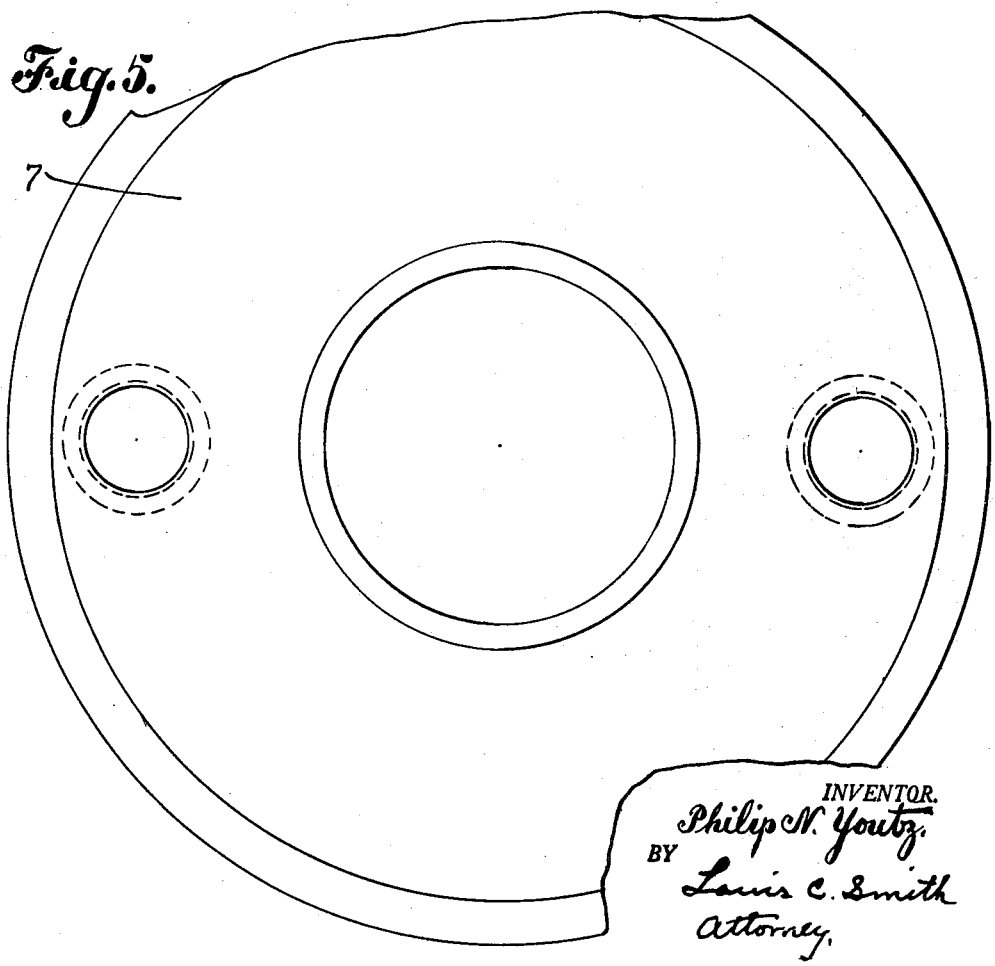
INVENTOR.
Philip N. Youtz
BY Louis C. Smith
Attorney.

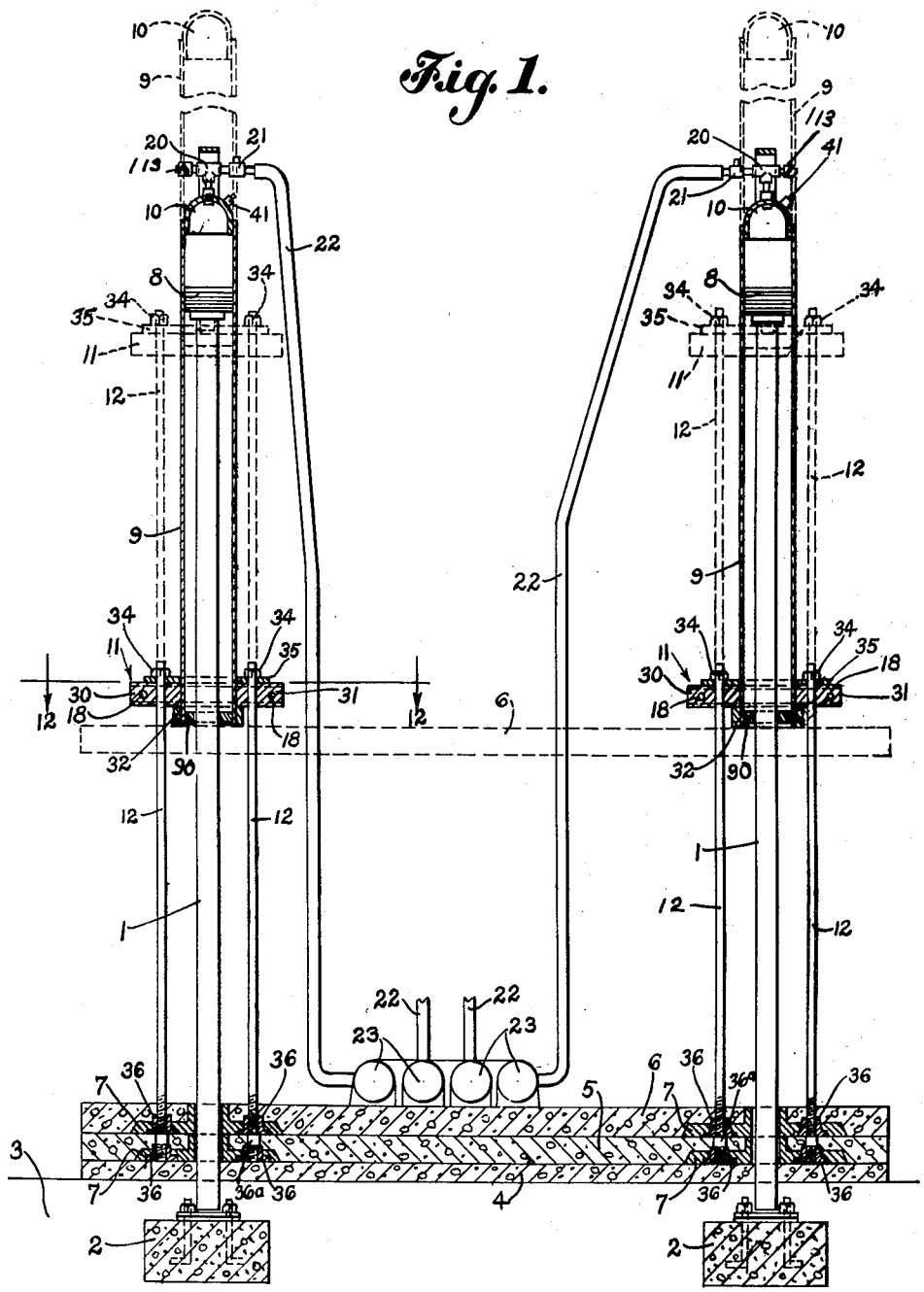

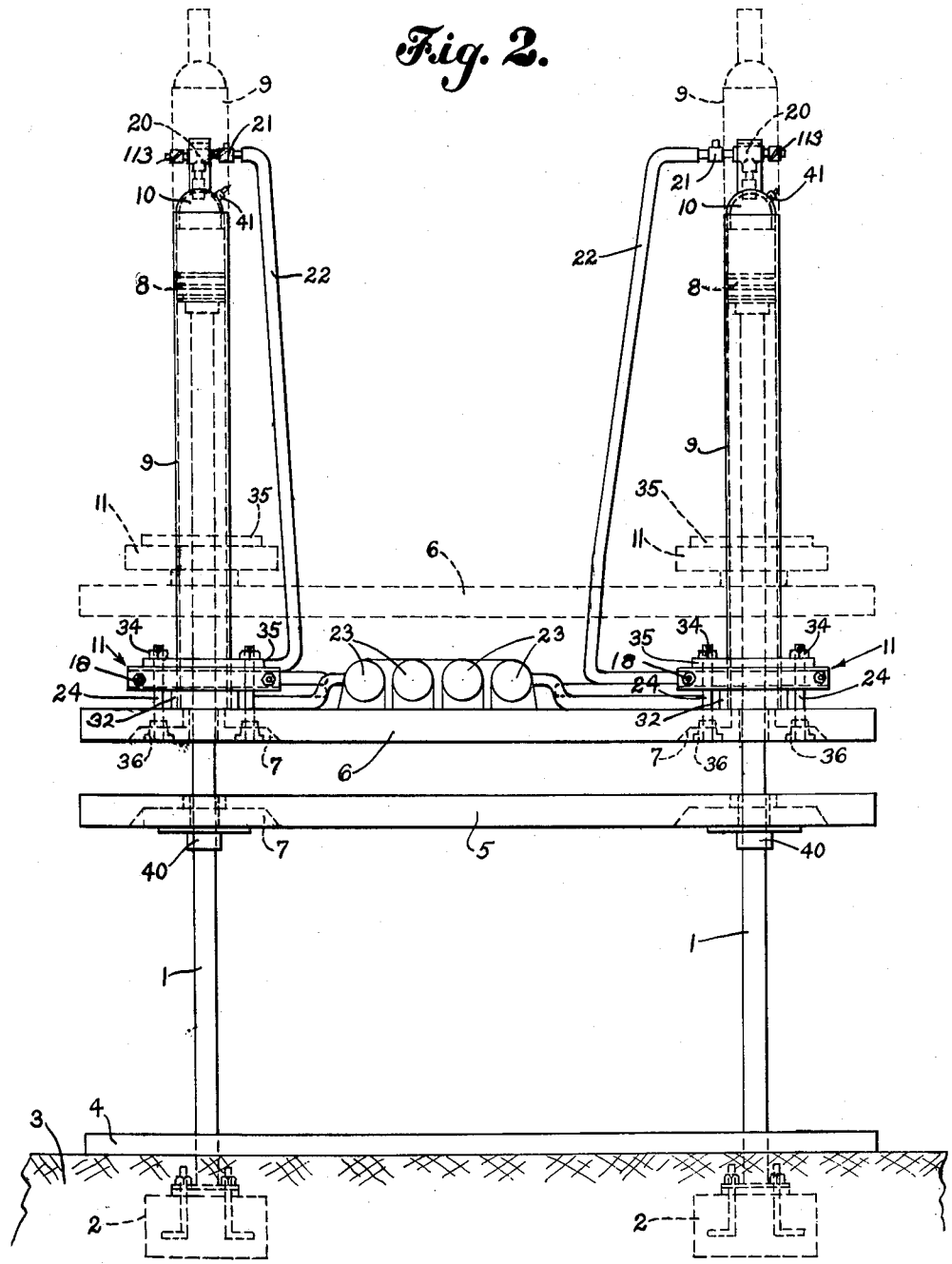

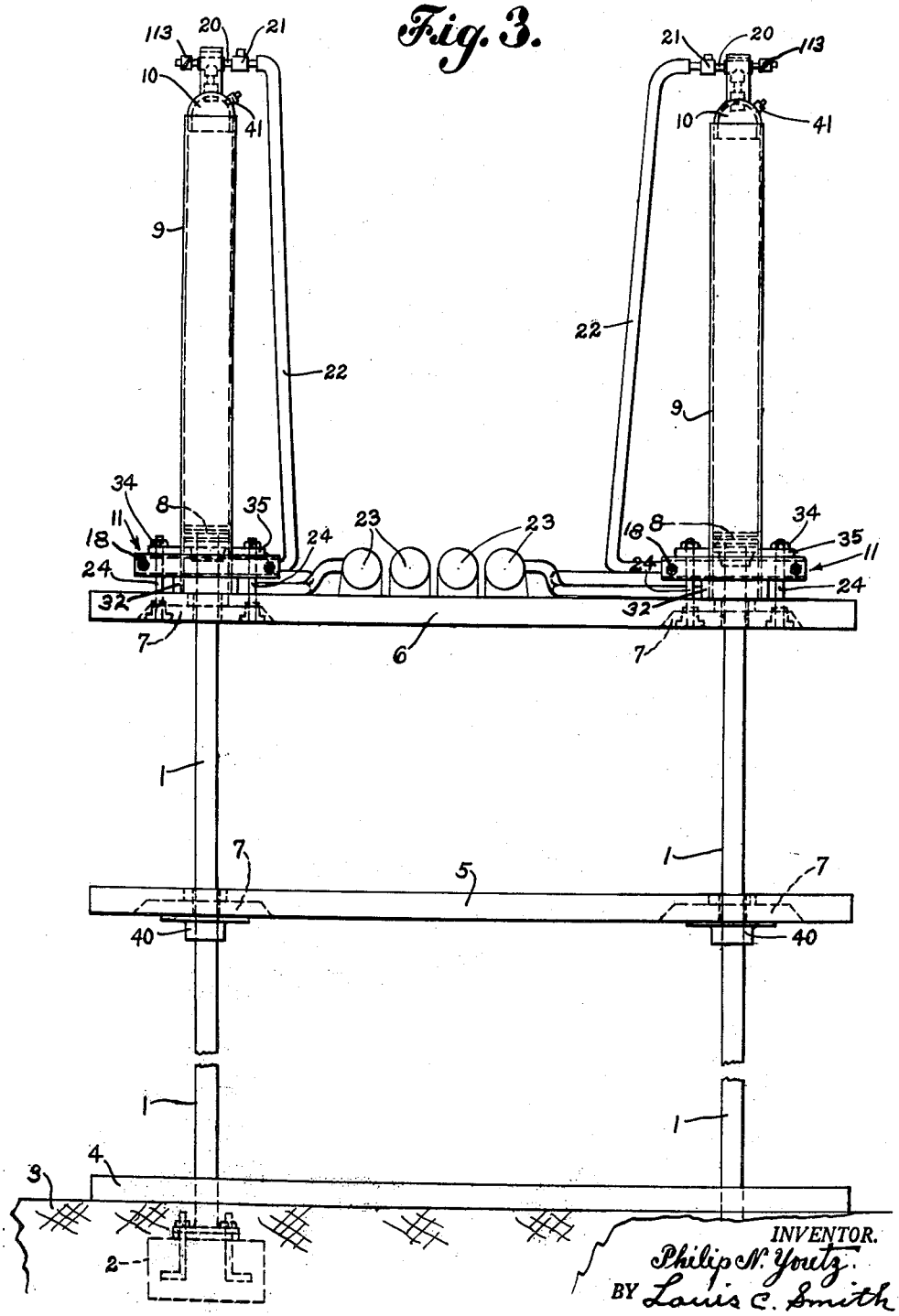

Jan. 6, 1959 P. N. YOUTZ 2,867,111
APPARATUS FOR ERECTING BUILDINGS
Filed Aug. 1, 1952 12 Sheets-Sheet 5
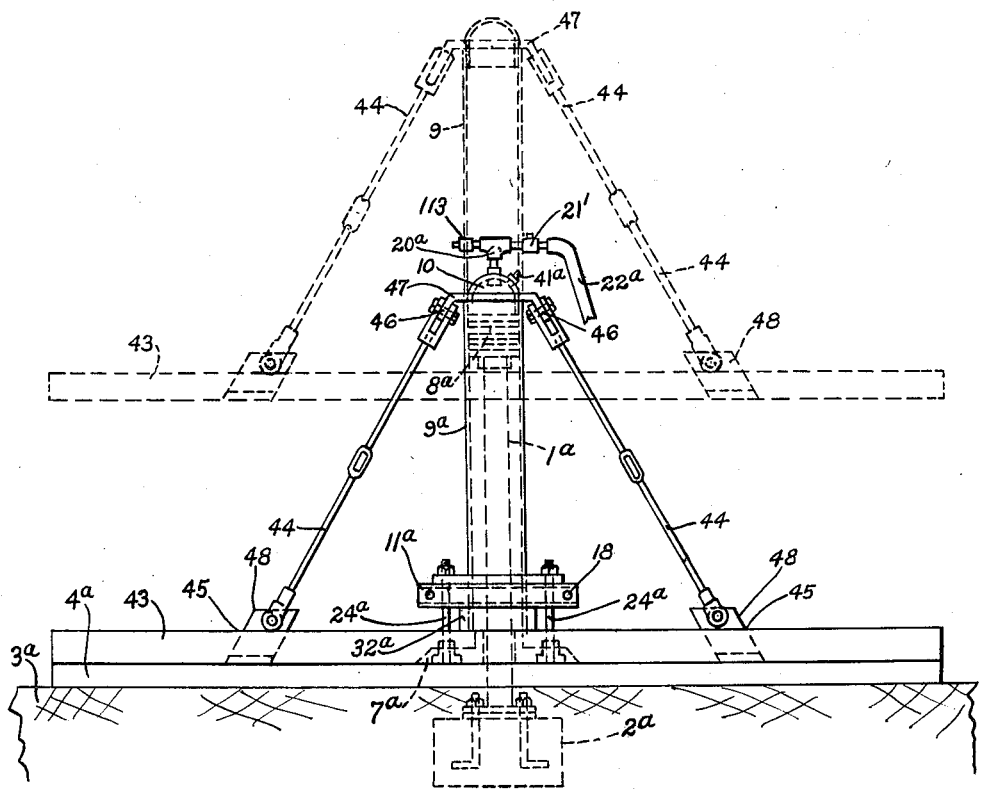
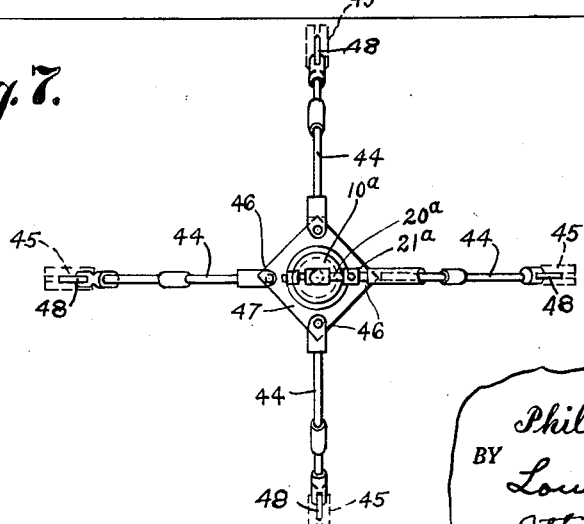
INVENTOR.
Philip N. Youtz
BY Louis C. Smith
Attorney.

Jan. 6, 1959     P. N. YOUTZ     2,867,111
APPARATUS FOR ERECTING BUILDINGS
Filed Aug. 1, 1952     12 Sheets-Sheet 6

INVENTOR.
Philip N. Youtz.
BY Louis C. Smith
Attorney.

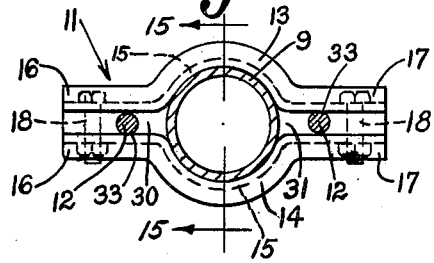
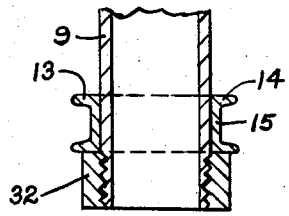
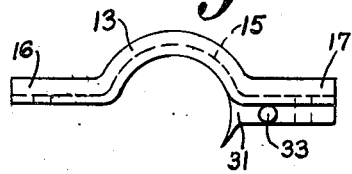
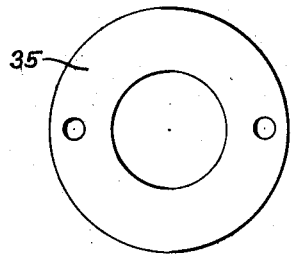
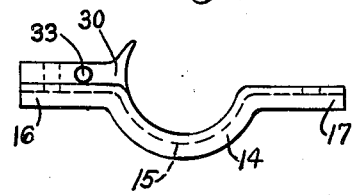
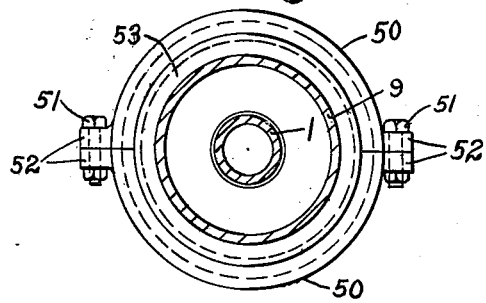

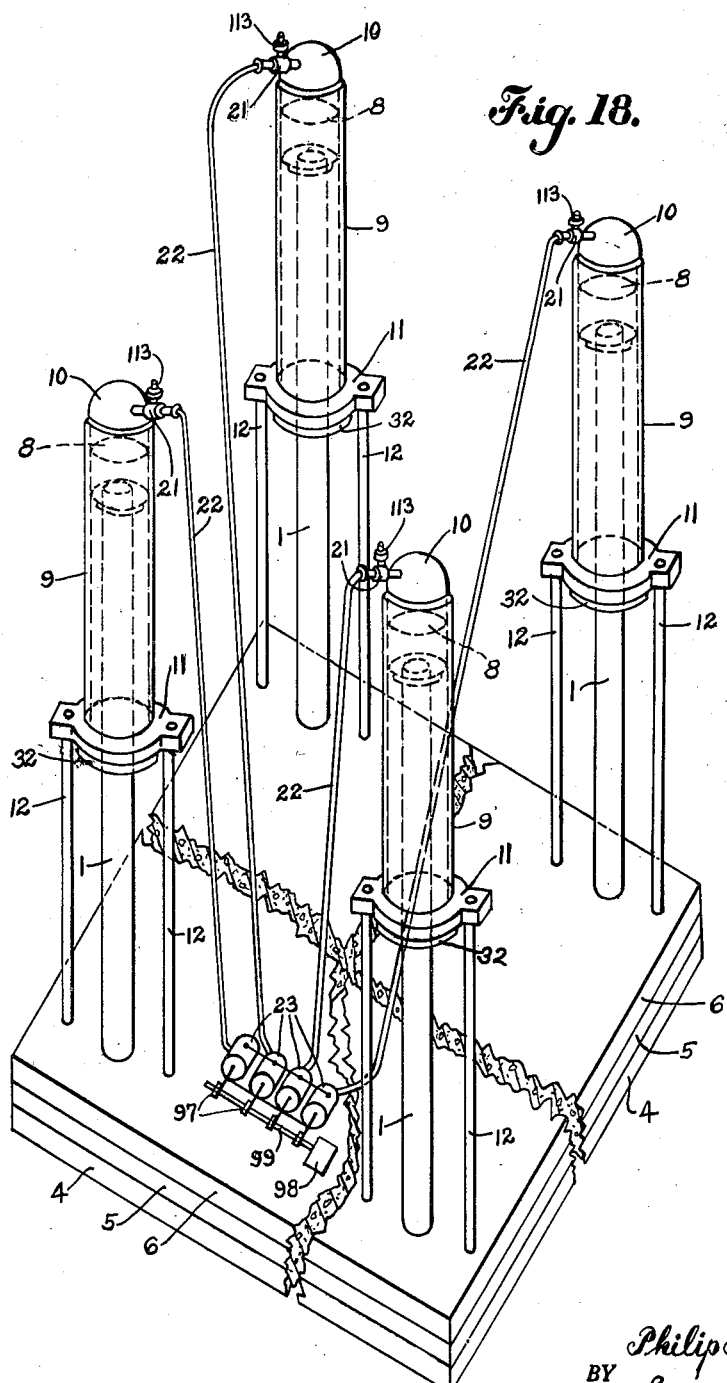

Jan. 6, 1959
P. N. YOUTZ
2,867,111
APPARATUS FOR ERECTING BUILDINGS
Filed Aug. 1, 1952
12 Sheets-Sheet 9
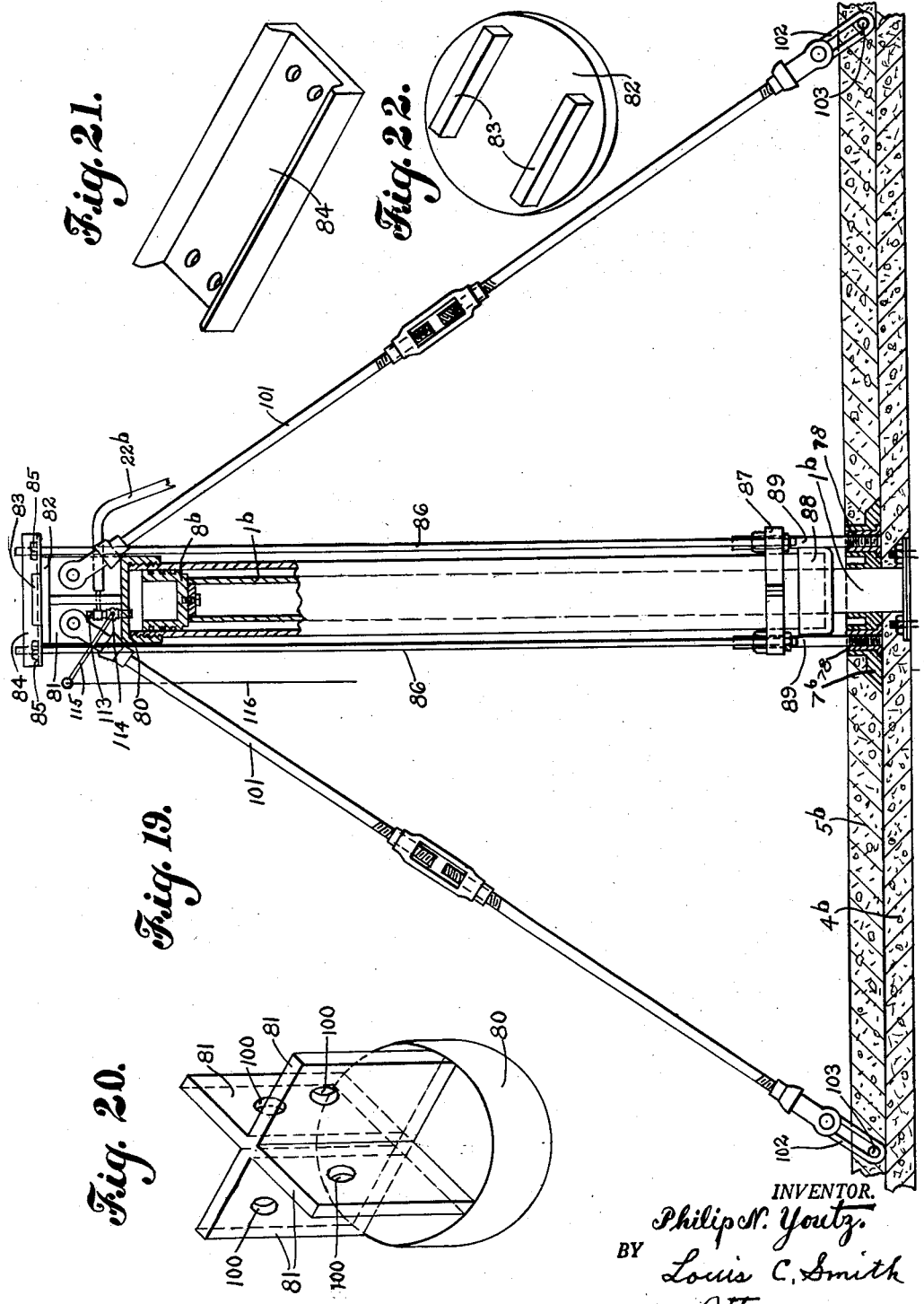
INVENTOR.
Philip N. Youtz.
BY Louis C. Smith
Attorney.

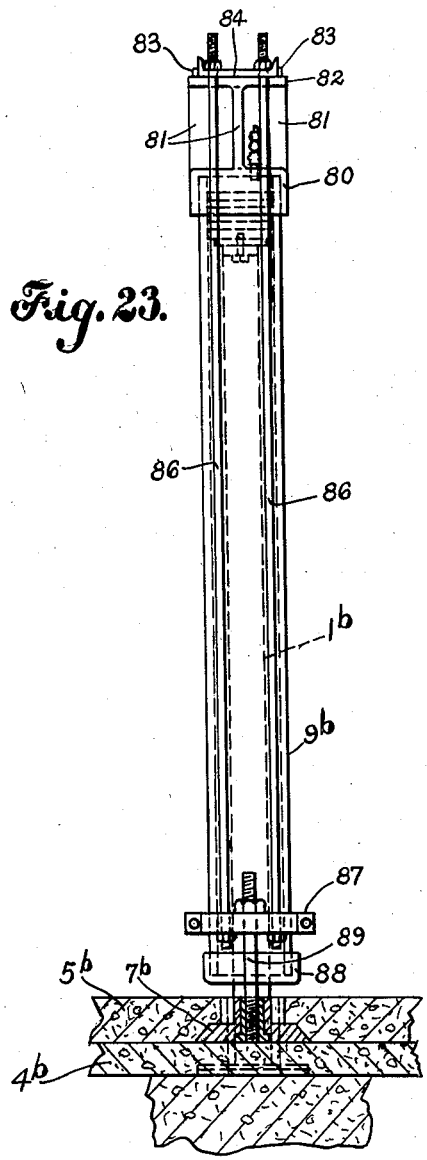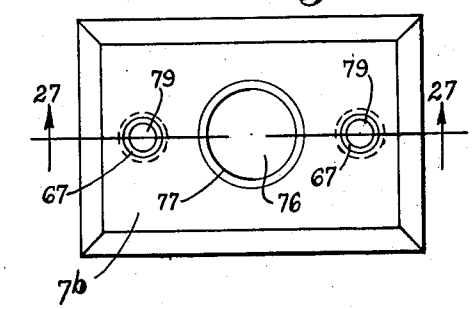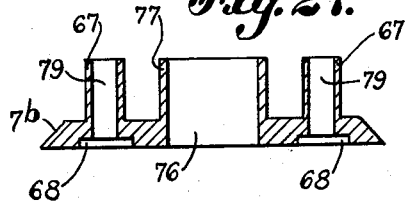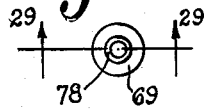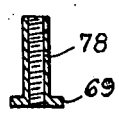

Jan. 6, 1959 P. N. YOUTZ 2,867,111
APPARATUS FOR ERECTING BUILDINGS
Filed Aug. 1, 1952 12 Sheets-Sheet 11

INVENTOR.
Philip N. Youtz.
BY Louis C. Smith
Attorney.

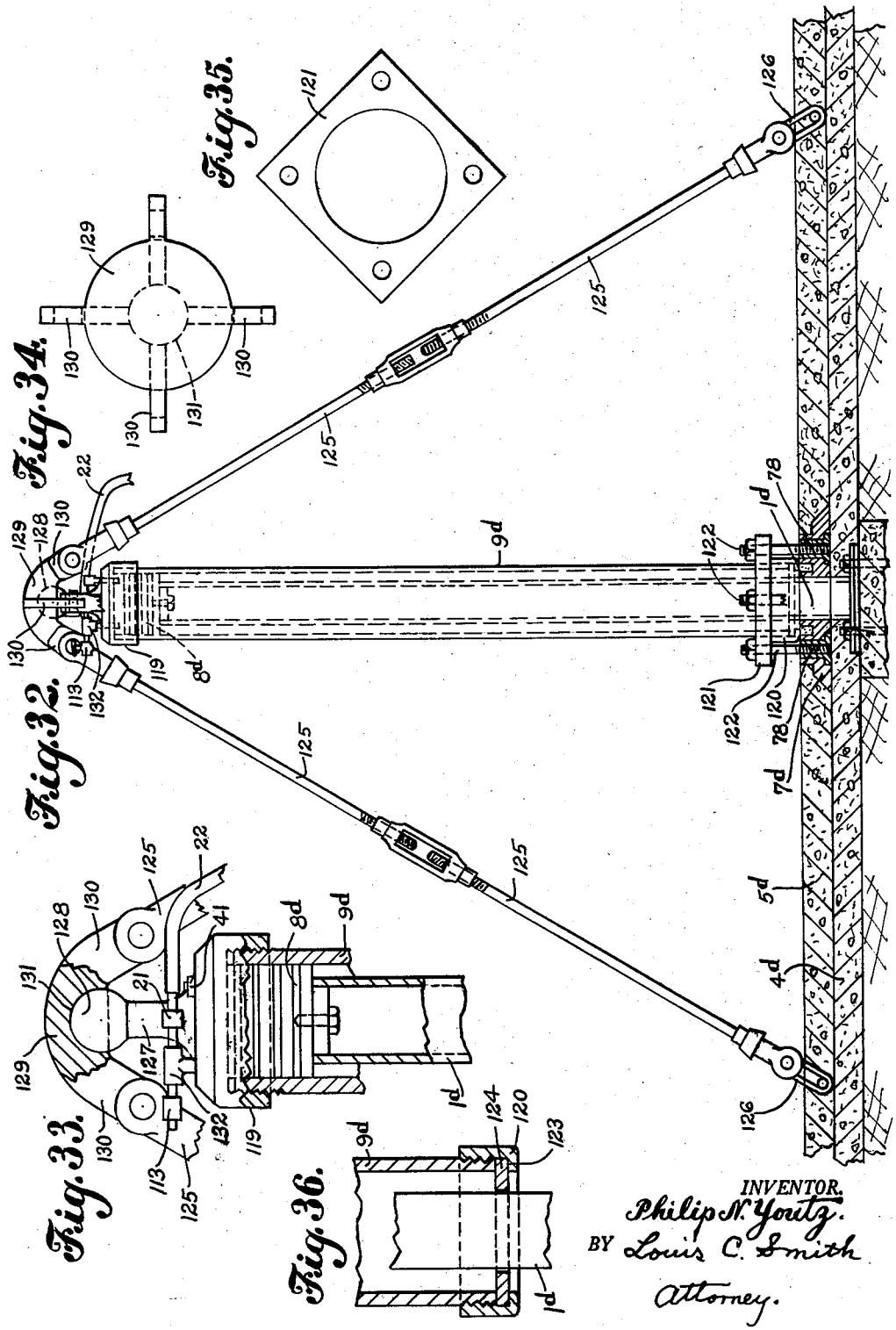

United States Patent Office 2,867,111
Patented Jan. 6, 1959

2,867,111

APPARATUS FOR ERECTING BUILDINGS

Philip N. Youtz, Yorktown Heights, N. Y.

Application August 1, 1952, Serial No. 302,076

7 Claims. (Cl. 72—1)

This invention relates to the erection of buildings, and especially to the method of building construction wherein the various upper floors are built or fabricated as complete units at ground or lower floor level and are then raised as units to their appointed levels in the completed building by means of lifting equipment carried by columns which constitute structural columns of the building being erected.

An object of the invention is to provide a novel and simple lifting equipment for thus raising the various upper floor units to the levels they are to occupy in the building when completed.

A further object of the invention is to provide a lifting equipment for this purpose in the nature of an hydraulic lift having a cylinder and a piston, in which the piston element is mounted on the top of a structural column forming a permanent part of the building being erected, and the cylinder element of the hydraulic lift has a length at least as great as the distance separating the lower floor and the second floor of the building when completed, said cylinder element being connected to the upper floor unit to be elevated, so that when water or oil or some other non-compressible liquid is pumped into the cylinder above the piston the cylinder will be raised thereby raising the floor unit.

Another object of the invention is to provide a lifting equipment in which the lifting of the upper floor unit from the ground floor level to its proper place in the building may be accomplished as a continuous operation from beginning to end.

Still another object of the invention is to provide a lifting equipment for the above purpose in which the load on each column during the lifting operation is carried axially thereof.

Another object of the invention is to provide novel means for synchronizing the operation of the hydraulic lifting devices mounted on the several structural columns.

A further object of the invention is to provide a novel indicating means for visually indicating at a central point the operation of the various lifting devices.

Referring to the drawings wherein is illustrated some selected embodiments of the invention:

Fig. 1 is a view illustrating lifting equipment embodying my invention applied to two structural columns of a two-story building being erected, the second story floor unit or slab and a third floor or roof unit or slab being shown at ground floor level;

Fig. 2 is a view showing the second story floor unit or slab raised to its permanent elevated position and the third floor unit or slab in a partially raised position above the second floor slab;

Fig. 3 is a view showing the lifting equipment readjusted for raising the third floor unit into its final position above the second floor unit;

Fig. 4 is an enlarged fragmentary sectional view showing one way of securing the lifting yoke to the lower end of the cylinder element;

Fig. 5 is a plan view of the collar by which the lifting yoke is secured to the floor unit to be lifted;

Fig. 6 is a view illustrating my improved lifting equipment as being used in connection with a single column for raising an upper floor unit to its proper position;

Fig. 7 is a plan view of Fig. 6;

Fig. 12 is a section on line 12—12, Fig. 1;

Figs. 13 and 14 illustrate the two channel members which together form the lifting yoke;

Fig. 15 is a section on line 15—15, Fig. 12;

Fig. 16 is a plan view of the flat ring used in connection with the lifting yoke;

Fig. 17 is a section on line 17—17, Fig. 8;

Fig. 18 is a diagrammatic perspective view illustrating four lifting jacks mounted on four columns for lifting a floor slab.

Fig. 19 is a view illustrating a different embodiment of the invention in which the weight of the floor slab to be raised is carried by the jack cylinder at its upper end.

Fig. 20 is a perspective view illustrating the cylinder head shown in Fig. 19.

Fig. 21 is a perspective view of the lifting arm shown in Fig. 19.

Fig. 22 is a perspective view of the cap plate for the cylinder head shown in Fig. 19.

Fig. 23 is a side view of Fig. 19.

Fig. 24 is a plan view of the lifting yoke illustrated in Figs. 19 and 23.

Fig. 25 is a side view of said yoke.

Fig. 26 is a plan view of the collar embedded in the slab to be lifted.

Fig. 27 is a section on the line 27—27, Fig. 26.

Fig. 28 is a flanged sleeve used in connection with the collar shown in Fig. 27.

Fig. 29 is a section on the line 29—29, Fig. 28.

Fig. 32 is a view partly in section showing a different embodiment of the invention;

Fig. 33 is an enlarged fragmentary sectional view showing the rocker member to which the guide rods are attached.

Fig. 34 is a plan view of the rocker member;

Fig. 35 is a view of the yoke to which the roof slab is attached;

Fig. 36 is a sectional view through the lower end of the cylinder.

Figure 8:
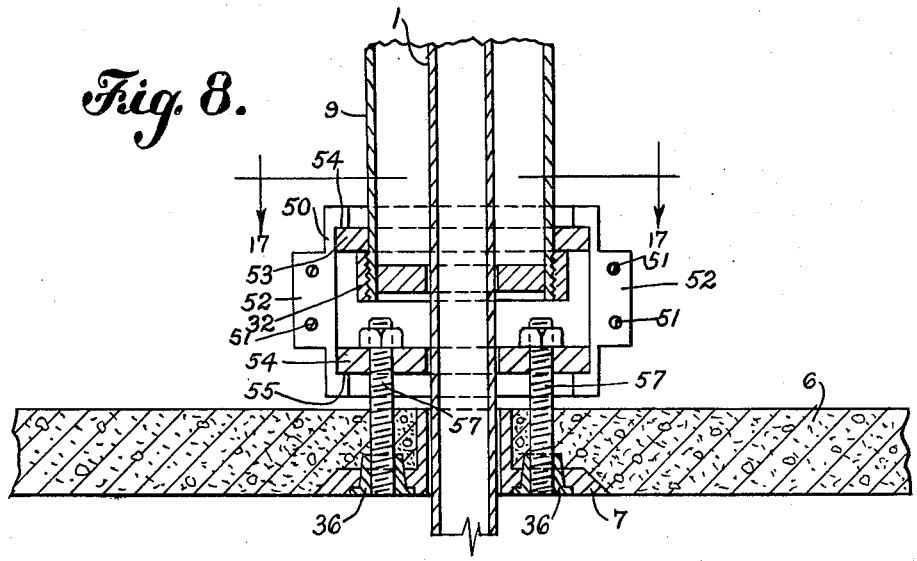
Fig. 8 is a fragmentary sectional view showing another form of lifting yoke.

In the drawings 1 indicates structural columns of a building to be erected and which eventually form permanent parts of the supporting structure of the building. The number of such columns will, of course vary with the size and character of the buildings. For many small rectangular buildings four columns will suffice, as shown in Fig. 18, in which the columns are placed inside of the outline of the building relatively near the corners thereof. In Figs. 1, 2, and 3 the two columns on one side of the building are shown. Each column is illustrated as mounted on and anchored to a suitable footing 2 which is embedded in the ground 3 on which the building stands.

4 indicates the ground floor slab of the building which is illustrated as being of concrete and as having been poured directly on the ground 3, said ground floor slab serving as a means for bracing the columns 1.

5 and 6 represent upper floor units which have been built at ground floor level and which are supported directly on the ground floor slab 4. If these upper floor units are of concrete, the second floor unit 5 may be poured directly on the ground floor slab 4, and after the second floor unit has been sufficiently cured the third floor unit 6 may be poured directly on the second floor unit.

It is to be understood that each floor unit will be covered with tar paper or other separating material impervious to water before another floor unit is poured thereon in order to prevent the separate units of becoming bonded together.

It is also to be understood that suitable curbing may be used to give proper definition to the periphery of each floor slab or unit as it is being poured.

Each upper floor unit has embodied therein a collar 7 which surrounds each column 1, said collars providing means for the attachment of the lifting equipment to the floor slabs to be raised.

The lifting equipment embodying my invention which is used for raising the upper floor units to their proper levels includes an inverted hydraulic jack carried by each column 1, each jack consisting of a piston head 8 mounted on the top of the column, and an elongated cylinder member 9 in which the piston head 8 operates. The cylinder member is provided at its upper end with a cylinder head 10 and means are provided for connecting said cylinder members to the floor unit to be lifted. In the construction shown in Figs. 1 to 5, the lower end of each cylinder is connected to the floor slab to be lifted so that the cylinder acts as a tension member in raising the slab.

As shown in Fig. 1, the cylinder member has a lifting yoke 11 secured thereto at its lower end and said yoke is connected by tension rods 12 to the floor unit 5 or 6 to be lifted. Each lifting yoke comprises two channel members 13, 14, shaped to present the central curved portion 15 and the two end portions 16, 17, said central portion having a curvature to fit the cylinder 9. The yoke members 13 and 14 are clamped around the cylinder 9 by means of clamping bolts 18, two filling blocks 30, 31, being located between the corresponding ends of said yoke members through which the clamping bolts 18 pass. The cylinder 9 has a collar 32 screw-threaded to its lower end on which the yoke 11 rests. In making the yoke I propose to weld the filling block 30 to the end 16 of the yoke member 14 and to weld the other filling block 31 to the end 17 of the yoke member 13 as shown in Figs. 13 and 14.

The upper ends of the tension rods 12 pass through openings 33 in the filling blocks and through a flat ring 35 which overlies the yoke, and have nuts 34 screw threaded thereto. The lower ends of the tension rods 12 are screw-threaded and are adapted to have screw-threaded engagement with interiorly threaded flanged bushings 36 seated in recesses formed in the under face of the collars 7 as best seen in Fig. 1.

Connected to each cylinder head 10 is a pipe 20 equipped with a check valve 21 and which is connected to a flexible pressure hose 22 leading to a suitable pump indicated at 23.

The vertical dimension of the columns 1 will depend upon whether the building to be erected is a single story building or a multiple story building. Assuming, for the sake of illustration, that the building is to have a second story, then the second floor unit 5 will constitute the floor of the second story and the ceiling of the first story, and the third floor unit 6 will constitute the ceiling of the second story.

For a two story building the columns 1 should have such a vertical dimension that the upper ends thereof are slightly above the final position which the third floor unit 6 is to occupy in the building.

The equipment illustrated in Figs. 1 and 2 is designed for raising the two floor unit 5 and 6 to different levels in the building, and when there are two or more floor units to be raised it may be preferable to raise them one at a time. In such case the tension rods 12 will be screwed into the bushings 36 in the upper floor unit 6 while the cylinders are in their lowered position as shown by full lines Fig. 1, and then liquid, either water or oil, is pumped into each cylinder member 9 above the piston head. Since each piston head is mounted on a structural column 1 the pressure developed within the cylinders will move them upwardly, thereby raising the floor unit 6. When said floor unit 6 has been raised to a position slightly above the second floor level as shown in dotted lines Fig. 1, said unit 6 is then temporarily parked in this position by being temporarily secured to the columns by any suitable standard connection not shown. The lifting rods are then unscrewed from the bushings 36 in the collars of floor unit 6, and said bushings are removed. The cylinder member 9 is then lowered by draining the liquid therefrom in some suitable way, as for instance, by syphoning said liquid off through a drain plug 41. The lifting rods 12 are then passed through the holes in the collars 7 of the floor unit 6, and are screwed into the bushings 36 in the floor unit 5 which has been cast with openings 36a to permit said lifting rods to pass therethrough. Liquid is again pumped into the cylinder members 9 and the floor unit 5 is raised to its permanent position slightly under the partially raised floor unit 6, as shown by full lines Fig. 2. Said floor unit 5 is then permanently attached to each column by a permanent standard connection, such as a flanged sleeve which is welded to the column as indicated at 40.

During this operation of lifting the floor units the cylinder members function as tension members from which the floor units being lifted are suspended.

When the second floor unit 5 has been anchored permanently to the columns 1, the lifting rods 12 may be removed and the cylinder members 9 again lowered as above described. The lifting yoke 11 on each lowered cylinder member is then connected to a collar 7 of the partially raised third floor unit 6 by means of short lifting rods 24 as shown in Fig. 2. Liquid is then again pumped into the cylinders, thereby moving them upwardly, as shown in dotted lines Fig. 2, and in full lines in Fig. 3, for the purpose of lifting the third floor unit 6 to its proper level in the building, which is the position illustrated in Fig. 3. When this has been done, said third floor unit may be permanently anchored to the columns as above described with reference to the second floor unit 5.

After the floor units have been permanently secured in their allotted positions, the lifting jacks may be readily removed from each column.

In order to synchronize the operation of the several inverted hydraulic jacks, a separate pump 23 is used to pump the water or other liquid into each jack cylinder, all the pumps being identical, and all the pumps are operated from the same shaft 99 which is driven by the motor 98. If desired each pump may be operatively connected to the shaft 99 through the medium of a clutch 97. With this construction the same amount of liquid will be pumped into each jack cylinder 9 at each rotation of the shaft 99 and hence the cylinders will all rise in unison and at the same rate.

The piston heads 8 are relatively large as compared to the pump pistons, so that the area of each piston head which is subjected to pressure during the lifting operation is many times that of the pump pistons. Hence a pump which will deliver water at approximately 250 p. s. i. will develop in the corresponding jack cylinder a lifting capacity measured in tons.

In order to increase the stability of the lifting jacks I propose to mount a ring 90 in the lower end of each cylinder 9 through which the column passes and which assists in holding the cylinder and column in true concentric relation.

In Figs. 6 and 7 I have illustrated an embodiment of my invention in which the floor unit is raised into position by means of lifting equipment mounted on a single column located centrally of the floor unit to be lifted.

In said Fig. 6, 4a indicates a ground floor slab on which has been poured an upper floor slab 43 which has embedded therein centrally thereof a collar 7a, similar to the collar 7 in Fig. 1, and 1a indicates a column mounted on a footing 2a and which extends through the collar 7a, which as stated above is located centrally of the upper floor slab 43. Mounted on the top of the column is a piston head 8a which operates in a cylinder 9a, said cylinder having the lifting yoke 11a at its lower end which rests on the ring 32a secured to the lower end of the cylinder and which is connected to the collar 7a of the floor slab 43 by means of the short rods 24a.

The delivery of liquid under pressure to the cylinder above the piston by means of the pipe 22a will elevate the cylinder, thereby raising the floor slab 43 as shown in dotted lines Fig. 6.

Since the cylinder is connected to the slab 43 at its center it is desirable to provide means by which the lifting force of the cylinder is applied to the slab not only at its center but at a plurality of points between its center and its periphery so as to obviate any danger of the slab breaking or cracking during the lifting operation.

For this purpose guy members 44 are shown which connect the upper portion of the cylinder 9a to the slab at the points 45. The upper ends of the guy members are connected to downwardly extending ears 46 on a ring 47 which is carried by the cylinder at its upper end. The lower ends of the guy members are shown as being connected to anchor plates 48 which are embedded in the floor unit 43.

In operating the apparatus shown in Fig. 6 it will, of course, be necessary to place suitable permanent supports, such as columns or walls, under the edge portions of the floor slab 43 after it has been raised to the desired level.

Figs. 8 and 17 show a lifting yoke having a different construction than that shown in Fig. 1 and which comprises two semi-circular members 50 which embrace the cylinder 9 and are bolted together by bolts 51 extending through mating ears 52 with which the members 50 are provided. The cylinder 9 is provided with the base 32, which is shown as screw threaded thereto, and on which rests a ring 53 that encircles the cylinder 9 and underlies a downwardly facing annular shoulder 54 formed on the members 50. Said members are also formed with an upwardly facing annular shoulder 55 on which rests a plate 56 that is connected to the collar 7 by means of rods 57 that are screw threaded into nuts 36 in the collar 7.

In Figs. 19 and 23 I have illustrated a different form of hydraulic jack in which the weight of the floor slab being lifted is applied to the top of the cylinder rather than to the lower end thereof, as in Figs. 1 to 5. In said figures a lifting equipment is shown for lifting the ceiling or roof slab of a one-story building, 4b indicating the ground floor slab and 5b the upper floor slab to be lifted. The structural columns which support the lifting equipment are indicated at 1b. Mounted on the upper end of each cylinder 9b is a cylinder head 80 which is screw threaded thereto, said cylinder head having webs 81 rising therefrom and welded thereto and presenting a cruciform shape. Mounted on and welded to the top of the webs is a cap plate 82 which has two spaced ribs 83 on its upper face. Situated between the ribs 83 is a lifting member 84 which rests on the cap 82 and the ends of which extend beyond the cap as shown at 85. Secured to and depending from the lifting member 84 are four lifting rods 86 which are secured at their lower ends to a lifting yoke 87 that surrounds the lower end of the cylinder 9b. The lifting yoke 87 is connected to the collar 7b in the slab 5b to be lifted by means of short bolts 89. The lower end of the cylinder 9b has a base cap 88 screw threaded thereto provided with an opening through which the column 1b loosely passes. When water or oil is pumped into the cylinder 9b above the piston head 8b the upward movement of the cylinder will operate through the lifting rods 86, the yoke 87 and the rods 89 to raise the floor slab 5b and in this construction, as stated above, the weight of the slab being lifted is carried by the lifting rods 86 instead of by the cylinder as in the construction shown in Figs. 1 to 5.

The yoke 87 is illustrated in detail in Figs. 24 and 25. It comprises two members 70 and 71 which are connected together by bolts 72, thus forming a yoke member which encircles the cylinder 9b. Each part 70, 71 of the yoke has an extension 73 provided with two holes 74 to receive the lifting rods 86 and two other centrally arranged holes 75 to receive the lifting rods 89.

The collar 7b, which is embedded in the material of the floor slab 5b, has a central opening 76 through which the column 1b passes and it has a flange or curb 77 surrounding said opening which extends to the top face of the slab 5b. In this construction the rods 89 are screw threaded into flanged sleeves 78 which extend through openings 79 formed in the collar 7b, each sleeve 78 having a flange 69 at its lower end which is received in a recess 68 with which the collar 7b is provided. These threaded sleeves 78 are of a length equal to the thickness of the slab 5b and the collar 7b is provided with upstanding circular flanges 67 which bound the openings 79 and in which the threaded sleeves 78 are received, said flanges being flush with the top of the slab 5b.

Each web 81 is provided with an opening 100 to provide for the attachment thereto of the upper end of a guy rod 101 in case it is desirable to use guy rods for distributing the lifting force of the cylinder to various parts of the slab being raised. The provision of the four webs 81 make it possible to use four guy rods if necessary or desirable. These guy rods may be fastened to the slab to be lifted in any suitable way. As shown in Fig. 19 each slab to be lifted is provided with a link 102 which is partially embedded in the concrete of the slab and encircles an anchoring rod 103 also embedded in the slab. The guy rods 101 are connected to the links 102.

Figure 30:
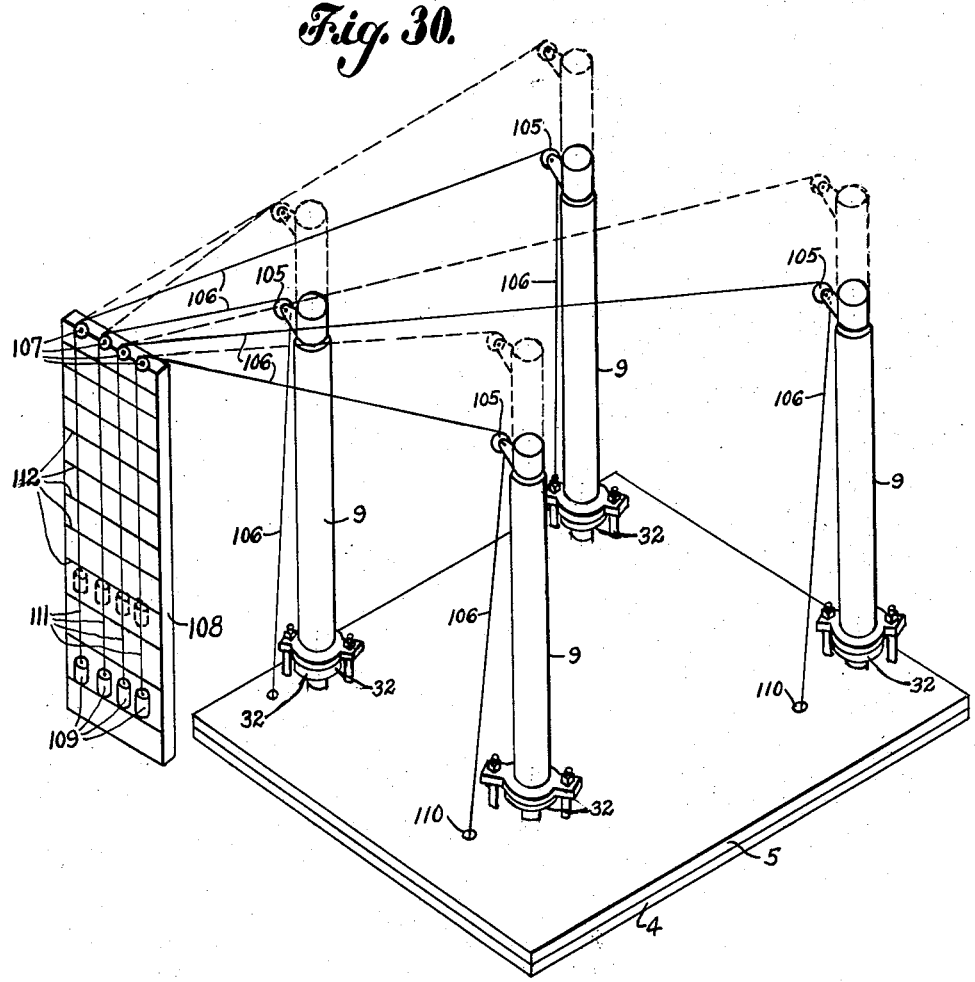
Fig. 30 is a perspective diagrammatic view illustrating the indicating means for indicating the rising movements of the slab being lifted.
Figure 31:
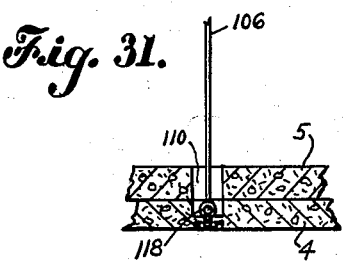
Fig. 31 is a fragmentary sectional view showing the manner of attaching the cord of the indicating equipment to the floor slab.

In order to give a visual indication of the rising movements of the several jack cylinders, the following mechanism is provided which is illustrated in Fig. 30. In said Fig. 30 the lifting equipment is shown in a diagrammatic manner rather than in mechanical detail, in order to simplify the illustration. Each cylinder 9, (9a, 9b) has a pulley 105 mounted thereon at its upper end over which passes a cord or flexible connection 106. One end of each flexible connection is permanently connected to a fixed anchorage, which in the illustrated form of the invention, is the ground floor slab 4. For this purpose the floor slab 5 to be raised is provided with an opening 110 through which the cord 106 passes, the end of the latter being shown as secured to an eye-bolt 118 anchored in the floor slab 4.

From the various pulleys 105 each cord 106 passes over another direction pulley 107 mounted on the upper end of an indicating board 108 which is stationarily supported at some convenient point on or outside of the floor units being raised. The end 111 of each cord has a weight 109 secured thereto which is suspended in front of the indicating board 108.

Where there are four jack cylinders, as shown in Fig. 30 there will be four pulleys 107 mounted on the indicating board 108 and four cords 106 passing over these four pulleys, each cord having its weight 109 attached to its lower end.

The cords are of such length that when each cylinder is in its lowered position ready for a lifting operation, the weights 109 will all be located on the lower portion of the board and in line with each other, as shown in full lines Fig. 30.

The front face of the indicating board will preferably be provided with a plurality of parallel, horizontal indicating marks 112.

As the cylinders rise during the raising of any floor slab, the pulleys 105 will move upwardly, and because of the fact that one end of each cord is anchored to the ground floor slab 4, the rising movement of the pulleys will cause the weights 109 to be moved upwardly, the upward movement of each weight being proportional to that of the corresponding cylinder.

Hence, the vertical positions of the various weights 109 will indicate the amount which the various cylinders have moved upwardly at any given time. If the cylinders all move upwardly at the same speed, the weights 109 will remain in a horizontal line as they move upwardly, but if at any time any weight is above or below the other weights, such fact will indicate that the corresponding cylinder is not moving upwardly in uniform relation with the other cylinders, a condition which would require correction.

It would be possible to use the indicating means above described to give a visual indication when the floor unit being raised had reached the level at which it is to be permanently attached to the columns. This could be done by making a special mark on the indicating board 108, and then stopping the operation of the hydraulic jacks when the weights 109 registered with such special mark.

Each pipe 20 leading to a jack cylinder is shown as having a vent valve 113 connected thereto, the purpose of which is to permit the escape of air from each cylinder when the pumping operation starts and to insure that during the lifting operation the cylinders are completely filled with water and contain no air pocket.

Figure 9:
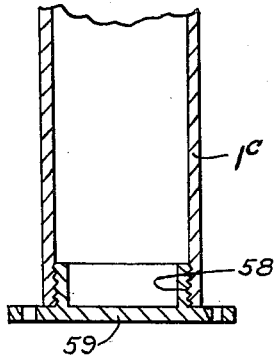
Fig. 9 is a fragmentary sectional view showing one way of mounting a supporting column on which the lifting equipment is mounted.
Figure 10:
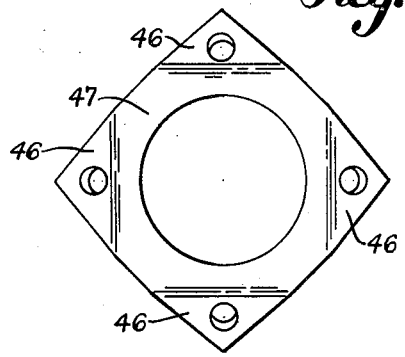
Fig. 10 is a plan view of a ring for connecting the guy members of Fig. 6 to the cylinder member.
Figure 11:
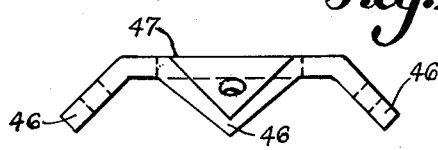
Fig. 11 is a side view of Fig. 10.

If the column on which the lifting equipment is mounted is not to become a permanent column of the building being erected, said column may be removably mounted on its footing. One way of providing for this is shown in Fig. 9, wherein the column 1c is screw-threaded onto exterior screw threads formed on a circular flange 58 rising from a plate 59 that may me secured to the footing in any suitable way.

One advantage of the lifting equipment herein described is that the upward movement of the floor slab may be continuous from beginning to end since there is no necessity of halting such upward movement at frequent intervals for the purpose of readjusting lifting jacks. As a result, the time required for lifting a floor slab to the required level is greatly reduced.

Furthermore, lifting equipment embodying my invention is very simple as it involves only the piston head for each column 1, the corresponding cylinder member, and the lifting yoke and rods for connecting the cylinder to the floor unit to be lifted.

The use of the check valve 21 prevents any return flow of liquid through the pipe 20 during the lifting operation and serves to hold each cylinder in its raised position while the floor unit is being permanently attached to the columns 1. This constitutes a safety feature which prevents any retrograde movement of any floor unit after it has been raised.

Another advantage of the construction herein shown is that the load on each column during the lifting operation is in the axial line of the column, and hence there is no danger that any column will be deflected by the weight supported thereon.

Figs. 32–34 show an embodiment of the invention employing guy rods and which is provided with means for equalizing the strain on oppositely disposed guy rods thereby reducing the bending moment on the column to a negligible amount.

In Fig. 32 4d indicates the ground floor slab and 5d indicates the upper floor slab which is to be raised. The column on which the lifting equipment is mounted is shown at 1d, and 8d is the piston head stationarily mounted on the upper end of the column. 9d is the elongated cylinder in which the piston head operates, said cylinder being closed at its upper end by the cylinder head 119 and having the base ring 120 screw threaded to its lower end. The cylinder is attached to the slab 5d to be raised by means of a yoke 121 which encircles the cylinder and rests on the base ring 120, and rods 122 connect the yoke to the collar 7d which is embedded in the slab 5d, said rods having screw threaded engagement with flanged sleeves 78 associated with the collar 7d as shown in Figs. 1 and 19. The base ring 120 has an interior shoulder 123 on which rests a flat guide ring 124 through which the column 1d passes with a loose fit, said guide ring serving to maintain the concentric relation between the lower end of the cylinder and the column. Guy rods 125 are used for distributing the lifting force over a relatively large area of the slab 5d to be raised in the same manner as shown in Figs. 6 and 19. Said guy rods may be connected at their lower ends to the slab in any suitable way, as by means of links 126 anchored in the slab as shown in Fig. 19.

In the construction shown in Fig. 32 the guy rods are arranged in pairs with the two rods of each pair oppositely disposed, and a connection is employed between the upper ends of the guy rods and the top of the cylinder by which the strain on the two oppositely disposed rods of any pair is equalized thereby reducing the bending moment on the column to a negligible amount.

For this purpose the cylinder head 119 has a post 127 rising therefrom which has a ball-shaped upper end 128 on which is supported a rocker member 129 provided with arms 130 to which the upper ends of the guy rods are pivotally connected. The rocker member 129 is provided on its under side with a socket 131 in which the ball 128 is received so that the rocker is capable of a rocking motion in any direction. The rocker member is shown as having four arms 130 spaced 90° apart thereby providing for the use of four guy rods if desired. The capability of rocking movement of the rocker member results in equalizing the strain on any two oppositely disposed guy rods and thereby the column will be relieved of any strains transmitted thereto through the guy rods which would tend to bend it.

The cylinder head 119 has a pipe connection 132 to which is connected a pressure pipe 22 leading to a pump as shown in Figs. 1–3. Said pipe connection has a check valve 21 therein and also is provided with a vent valve 113. The cylinder head is also provided with a drain plug 41 through which the liquid in the cylinder can be syphoned off when it is desired to lower the cylinder from its raised position.

In this embodiment of the invention part of the weight of the slab being lifted is transferred to the lower end of the cylinder 9d through the yoke 121 and the lifting rods 122, and the rest of said weight is transferred to the upper end of the cylinder through the guy rods 125 and the rocker member 129.

I claim:

1. Lifting equipment for use in erecting a building having a ground floor level and an upper floor level and also having vertical supporting columns and an upper floor unit supported by said columns at an upper floor level, said lifting equipment having means to raise an upper floor unit from ground floor level to an upper floor level, which means comprises a plurality of the supporting columns of the building being erected which columns rise to a level somewhat above the level to which the upper floor unit is to be lifted, a piston head mounted on the top of each column, each piston head having a diameter greater than that of the column on which it is mounted, a plurality of elongated cylinder members, one for each piston head, in which said piston heads operate, each cylinder member extending downwardly below the piston head therein and having a length greater than the height of a story of said building, said downwardly extending portion of each cylinder member telescoping the corresponding column and having its wall well spaced therefrom, means connecting each cylinder member to said upper floor unit to be lifted from ground floor level, and means to deliver simultaneously to each cylinder member above its piston head the same amount of liquid under pressure, whereby the cylinder members with the upper floor unit attached thereto are moved simultaneously upwardly at the same speed to carry said upper floor unit to its upper floor level.

2. Lifting equipment as defined in claim 1 and which includes a lifting member mounted on the top of each cylinder member, a yoke surrounding each cylinder member near its lower end, elongated lifting rods connecting each lifting member to the corresponding yoke, and means connecting each yoke to the corresponding floor unit to be raised.

3. Lifting equipment for use in erecting a building having a ground floor level and an upper floor level and also having vertical floor-supporting columns and upper floor units supported by said columns, said equipment having means to raise a floor unit from ground floor level to an upper floor level, which means includes a vertical floor supporting column of said building that rises to a level at least as high as the upper level to which the floor unit is to be lifted from ground level, a piston head detachably mounted on the upper end of said column and having a transverse dimension appreciably greater than that of the column, an elongated vertically movable cylinder member in which said piston head operates and which extends downwardly below the piston head for a distance at least as great as the vertical dimension of a story of said building, said cylinder member telescoping the column with the wall thereof well spaced from the column, means connecting the cylinder member to a floor unit located below it at ground level and which is to be raised to said upper floor level, means to admit liquid under pressure to the cylinder member above the piston head whereby said cylinder member with the upper floor unit attached thereto may be moved upwardly relative to the column to carry said floor unit to the upper floor level in one continuous movement, and means at the lower end of the cylinder member cooperating with the column to hold said cylinder member and column in true concentric relation during the upward movement of the floor unit.

4. Lifting equipment for use in erecting a building as defined in claim 3 in which the floor unit to be lifted is connected to the lower end of the cylinder member.

5. Lifting equipment for use in erecting a building as defined in claim 3 in which the floor unit to be lifted is connected to both the lower end and the upper end of the cylinder member.

6. Lifting equipment for use in lifting precast concrete floor slabs from ground level position to an upper floor level during the erection of a building having a plurality of vertical floor-supporting columns and concrete floor slabs supported thereby at an upper floor level, said equipment including a plurality of said columns, a piston head detachably mounted on the top of each column, each piston head having a transverse dimension greater than that of the column on which it is supported, a vertical cylindrical member for each piston head and in which said piston head operates, each cylinder member extending a distance below the piston head therein equal at least to the vertical dimension of a story of said building, each cylinder member telescoping the column on which it is mounted and having its peripheral wall well spaced from the column, means connecting the lower end of each cylinder member to the floor slab to be lifted, and means to deliver simultaneously to each cylinder member above the piston head therein the same amount of liquid under pressure, said last named means comprising a plurality of identical pumps, one for each cylinder, means connecting each pump to its cylinder and means common to all the pumps to operate them in unison whereby each pump delivers to its cylinder the same amount of liquid at the same pressure as every other pump.

7. Lifting equipment for use in lifting a precast concrete floor slab having an opening therethrough from a ground level position to an upper level position during the erection of a building having a supporting column which extends through the opening in the floor slab to be lifted and to a height above the upper level to which the floor slab is to be lifted, said lifting equipment including said column, a piston head detachably mounted thereon and having a transverse dimension appreciably greater than that of the column, a cylinder member in which said piston head operates and which extends downwardly from the piston head for a distance equal at least to the distance between the ground level position of the floor slab to be lifted and said upper floor level to which the floor slab is to be lifted, the depending portion of the cylinder telescoping the column with its wall well spaced from the column, means connecting the lower end of the cylinder member to the portion of the floor slab to be lifted at points immediately surrounding the opening therein, guy members connecting the upper end of the cylinder member to the floor slab at a plurality of points widely spaced from said opening, and means to deliver liquid under pressure to the cylinder member above the piston head whereby said cylinder member with the upper floor slab attached thereto may be moved upwardly to carry said floor slab to its upper floor level in one continuous movement.

References Cited in the file of this patent

UNITED STATES PATENTS

| | | |
|---|---|---|
| 216,326 | Hyde | June 10, 1879 |
| 1,066,436 | Peltzer | July 1, 1913 |
| 1,435,486 | Leon et al. | Nov. 14, 1922 |
| 2,336,148 | Zoll | Dec. 7, 1943 |
| 2,412,414 | Mueller | Dec. 10, 1946 |
| 2,540,679 | Laffaille | Feb. 6, 1951 |
| 2,715,013 | Slick | Aug. 9, 1955 |

FOREIGN PATENTS

| | | |
|---|---|---|
| 684,089 | France | of 1930 |
| 613,403 | Great Britain | of 1948 |